US012671770B2

(12) United States Patent
Lee et al.

(10) Patent No.: US 12,671,770 B2
(45) Date of Patent: Jun. 30, 2026

(54) GENERATION OF SCAN DATA BY USER INPUT

(71) Applicant: Hewlett-Packard Development Company, L.P., Spring, TX (US)

(72) Inventors: Jaein Lee, Seongnam Si (KR); Kabdeuk Kim, Seongnam Si (KR); Hyunju Kim, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 253 days.

(21) Appl. No.: 18/703,787

(22) PCT Filed: Apr. 13, 2022

(86) PCT No.: PCT/US2022/024550
§ 371 (c)(1),
(2) Date: Apr. 23, 2024

(87) PCT Pub. No.: WO2023/075833
PCT Pub. Date: May 4, 2023

(65) Prior Publication Data
US 2025/0008034 A1 Jan. 2, 2025

(30) Foreign Application Priority Data
Oct. 28, 2021 (KR) ........................ 10-2021-0145821

(51) Int. Cl.
*H04N 1/00* (2006.01)

(52) U.S. Cl.
CPC ..... *H04N 1/00442* (2013.01); *H04N 1/00474* (2013.01); *H04N 1/0049* (2013.01)

(58) Field of Classification Search
CPC ........... H04N 1/00442; H04N 1/00474; H04N 1/0049; H04N 1/0035; H04N 1/00405; H04N 1/00408; H04N 1/00411; H04N 1/0044; H04N 1/00811; H04N 1/00822; H04N 1/00352; H04N 1/00424; H04N 1/00477; H04N 1/00572; H04N 2201/0094
USPC ........................................................ 358/1.13
See application file for complete search history.

(56) References Cited

U.S. PATENT DOCUMENTS

| | | | |
|---|---|---|---|
| 7,359,083 B2 | 4/2008 | Salgado | |
| 2003/0049062 A1* | 3/2003 | Machida | .............. H04N 1/3877 |
| | | | 399/371 |
| 2005/0134871 A1 | 6/2005 | Nakagiri | |
| 2006/0132821 A1 | 6/2006 | Nonaka et al. | |
| 2011/0222095 A1 | 9/2011 | Sheng | |

(Continued)

FOREIGN PATENT DOCUMENTS

| | | |
|---|---|---|
| EP | 1530359 A2 | 5/2005 |
| JP | 2010-041541 A | 2/2010 |

*Primary Examiner* — Charlotte M Baker
(74) *Attorney, Agent, or Firm* — Foley & Lardner LLP

(57) ABSTRACT

An example electronic device includes a processor and a memory to store instructions executable by the processor. The processor, by executing the instructions, is to display a user interface related to a document scan, generate scan data regarding a first page and a second page of a document in response to a user input received through the user interface, and display, through the user interface, a first scan result including the first page and the second page of the document or a second scan result including one of the first page and the second page of the document based on the scan data.

15 Claims, 8 Drawing Sheets

(56)                References Cited

U.S. PATENT DOCUMENTS

2012/0170082 A1 *    7/2012   Labois ................... G06V 10/28
                                               358/474
2015/0350470 A1     12/2015   Ha et al.

* cited by examiner

GENERATION OF SCAN DATA BY USER INPUT

BACKGROUND

An image forming apparatus may perform various operations as well as an image forming operation such as printing, copying, scanning, faxing, storage, transmission, and coating. A user may scan a document, save, copy, and transmit a scanned document through various operations performed by an image forming apparatus. Various methods may be used to improve accessibility to the operations performed in the image forming apparatus. For example, a user interface for using functions provided by an image forming apparatus may be displayed, and a user may interact with the user interface to scan a document through the image forming apparatus. However, it may be difficult for a user to fully use various functions of the image forming apparatus as the number of functions provided by the image forming apparatus increases.

BRIEF DESCRIPTION OF THE DRAWINGS

Various examples will be described below by referring to the following figures.

DETAILED DESCRIPTION

Figure 1:
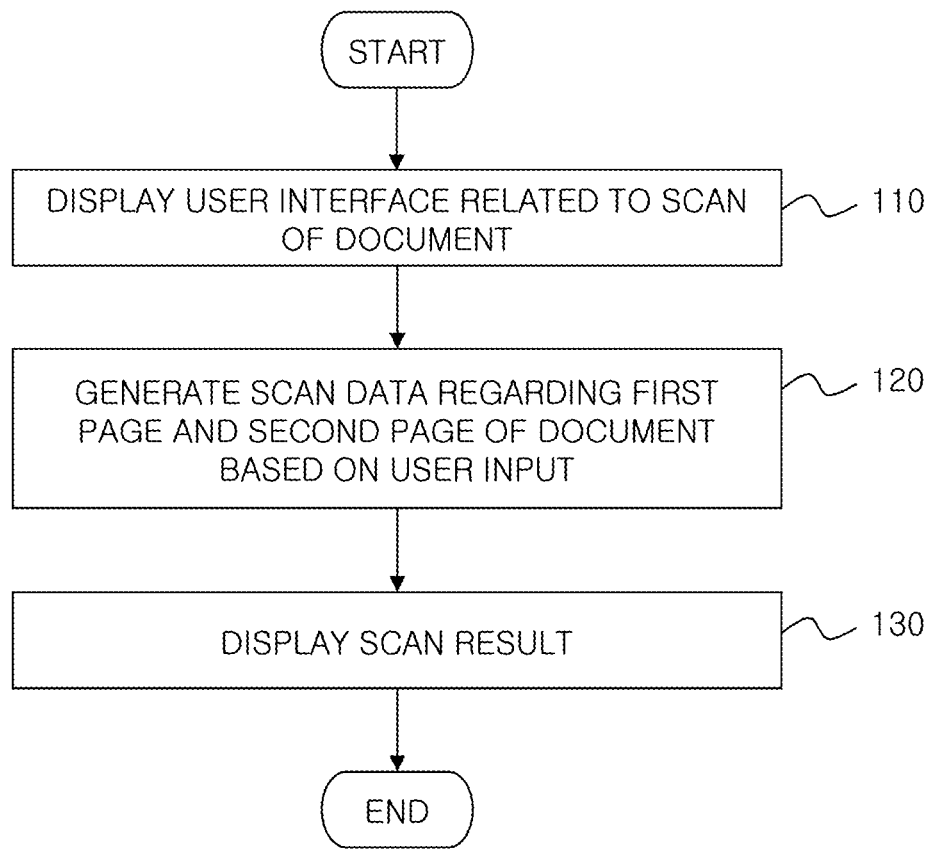
FIG. 1 is a flowchart illustrating a process of scanning a document in an electronic device according to an example.

A user may scan a document, and save, copy, or transmit a scanned document through various operations performed by an image forming apparatus. For example, an image forming apparatus may perform a simplex scan or a duplex scan, may exclude a blank page from a scanned document, may change or rotate an orientation of a scanned document, and may display a scan result for a user to review a scanned document.

In some situations, a user may miss a back page of a two-sided document in a case where a simplex scan is performed on a front page of the document. In another situation, a user may be inconvenienced by viewing unnecessary contents in a case where a duplex scan is performed on a scrap paper. In an example, an image forming apparatus to efficiently scan a document is provided.

In an example, an electronic device includes a processor and a memory to store instructions executable by the processor. The processor, by executing the instructions, is to display a user interface related to a document scan, generate scan data regarding a first page and a second page of a document in response to a user input received through the user interface, and display, through the user interface, a first scan result including the first page and the second page of the document or a second scan result including one of the first page and the second page of the document based on the scan data.

In an example, an electronic device is to display, through a user interface, a third scan result where at least one page is skipped from the first scan result and the second scan result according to a predetermined criteria.

Accordingly, a user may scan a document through an image forming device efficiently and conveniently.

Hereinafter, examples will be described with reference to the accompanying drawings. However, the present disclosure may be implemented in various different forms and is not limited to the examples described herein.

Terms including ordinals such as first, second, etc. may be used to identify various components, but the components are not limited by the terms. These terms are used for the purpose of distinguishing one component from another. For example, a first component may be referred to as a second component, a second component may be referred to as a first component, and their ordinal number may be omitted.

An "electronic device" or "electronic apparatus" may refer to an apparatus to receive a user's command and display information processed according to the user's command. The electronic apparatus may be, for example, an image forming apparatus, a personal computer (PC), a tablet PC, a personal digital assistant (PDA), a laptop, a smartphone, a mobile phone, or the like. In the electronic apparatus, a program related to an operation of the electronic apparatus or an external apparatus may be installed. For example, a program related to an example operation described below may be installed on the electronic apparatus. An "image forming device" or "image forming apparatus" may refer to any kind of device capable of performing an image forming operation, such as a printer, a copier, a scanner, a fax machine, a multi-function printer (MFP), a display device, etc. The image forming device may also be a two-dimensional (2D) image forming device or a 3D image forming device. An "image forming operation performed by the image forming device" may refer to an operation related to printing, copying, scanning, faxing, storage, transmission, coating, etc., or a combination of two or more of the operations described above.

"Scanned data" may refer to data generated by scanning a document. For example, the scanned data may refer to data generated by performing a duplex scan on a document, but is not limited thereto. For example, the scanned data may refer to data generated by scanning a first page or a second page of a document. For example, the scanned data may refer to data generated by scanning at least one of a first page or a second page of a document. The first page and the second page may be a front page and a back page, respectively. The front page and the back page may be referred to as a top page and a bottom page. The scanned data may refer to data saved in a memory by scanning a document, and the scanned data may be saved in the memory temporarily. The scanned data may be image data.

A "scan result" may refer to a result displayed on an image forming device based on the scanned data, and a user may view the displayed scan result. For example, front pages of a document may be displayed as a scan result without displaying back pages, but is not limited thereto. For examples, back pages of the document may be displayed as the scan result or front and back pages of the document may be displayed as the scan result. For example, at least one page of the document may be displayed as the scan result, or pages excluding at least one page may be displayed as the scan result. The scan result may be saved and transmitted as a file, and a copy may be printed based on the scan result through the image forming device.

FIG. 1 is a flowchart illustrating a process of scanning a document in an electronic device according to an example.

Figure 2:
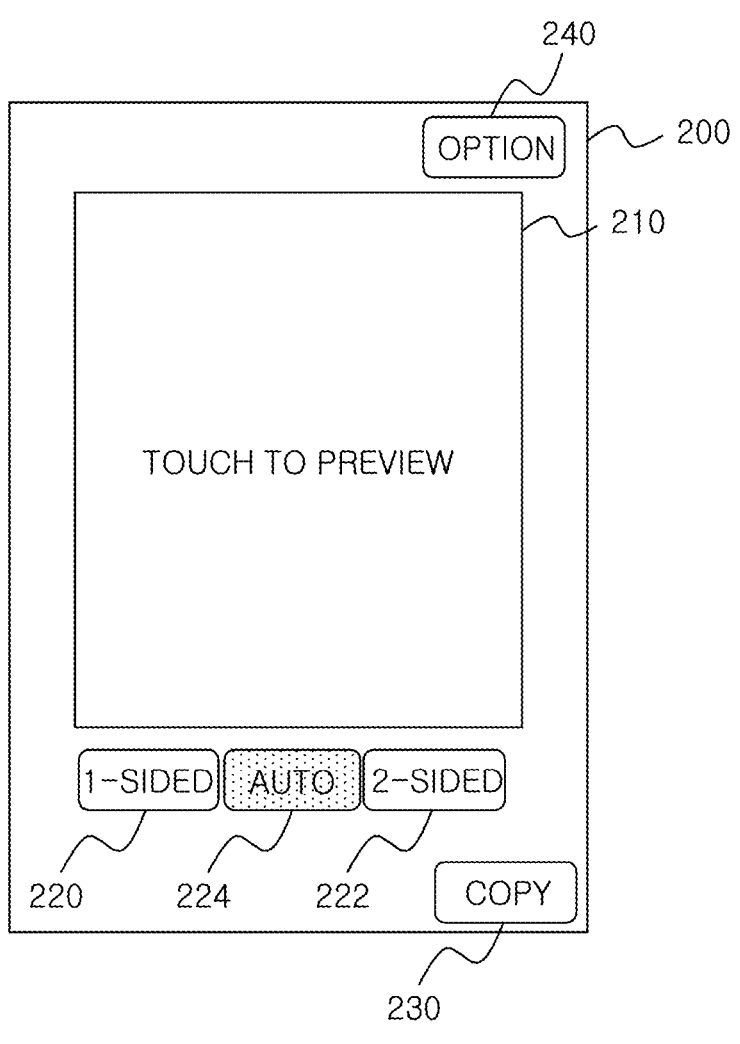
FIG. 2 is a diagram illustrating a user interface displayed on an electronic device to scan and copy a document according to an example.

For convenience of explanation, FIG. 2 is further referred.

FIG. 2 is a diagram illustrating a user interface displayed on an electronic device to scan and copy a document according to an example.

Referring to FIG. 1, the electronic device may display a user interface related to a document scan at operation 110. The electronic device may be an electronic device connected to or mounted to an image forming device, or the image forming device itself.

Referring to FIG. 2, a user interface 200 related to a document scan may be a user interface 200 to make a copy of a scanned document. The user interface 200 may include various interfaces 220, 222, 224, and 240 to set options of a scan. For example, the user interface 200 related to the document scan may include a simplex scan interface 220 to set a simplex scan option, a duplex scan interface 222 to set a duplex scan option, and an automatic scan interface 224 to set an automatic scan option. In the example of FIG. 2, the interface 224 being activated by a user may be highlighted. The user interface 200 related to the document scan may include an interface 240 to set various options. Based on the interface 240 being selected by a user, interfaces to set various options related to the scan, for example, a mono scan, a color scan, a paper size, a resolution, a scan direction, etc. may also be selected.

A duplex scan option, a blank page skip option, and an automatic page orientation option may be activated in a case where the automatic scan interface 224 is activated. An example of the automatic page orientation option will be explained later by referring to FIG. 4.

At operation 120, the electronic device may generate scan data regarding a first page and a second page of a document in response to a user input. The scan data regarding the first page and the second page of the document may be generated in a case where the duplex scan option is activated. For example, the electronic device may generate the scan data by performing a scan on the first page and the second page of the document in response to a user input. The scanned data generated for the first page and the second page of the document may be referred to as duplex scan data. The user input may be received through the user interface 200. For example, the user input may include selection of an interface 210 for displaying a preview a scan result. The user input may further include activation of the automatic scan interface 224 before the selection of the interface 210. FIG. 2 illustrates an example in which the user interface 200 related to the document scan includes the simplex scan interface 220, the duplex scan interface 222, and the automatic scan interface 224, but is not limited thereto. The automatic scan option may be activated by default, and the interfaces 220, 222, and 224 may be not displayed.

For example, in the scan settings, even in a situation in which the duplex scan option and the blank side skip option are deactivated, the duplex scan option or the blank page skip option, or both of them may be automatically activated in a case where an execution command to the automatic scan interface 224 is received.

The first page and the second page of the document may be a front page and a back page of the document, respectively, and the scan data may be generated for front pages and back pages of a plurality of documents. The scan data may be generated for both pages of the document. In a case where the automatic scan option is set, the scan data for both the first page and the second page of the document may be generated similarly to a situation in which the duplex scan option is set.

At operation 130, the electronic device may display a scan result. The scan result may be displayed based on the scan data generated at operation 120.

The scan result including both the first page and the second page of the document may be displayed based on the scan data. The scan result including both the first page and the second page of the document may be referred to as a first scan result. In a case where the scan data for the first and second pages of the documents are generated, the first scan result may include both the first pages and the second pages of the documents. Through the first scan result, the front and back pages of the documents may be displayed together. Referring to FIG. 2, in a case where scanning is performed based on the duplex scan interface 222 being selected, the first scan result for displaying both pages of the document may be displayed.

Based on the scan data, the scan result including one of the first page and the second page of the document may be displayed without displaying the other of the first page and the second page. A scan result including one of the first page and the second page of the document may be referred to as a second scan result. Through the second scan result, the front page or the back page of the document may be displayed. Based on the scan data for the first pages and the second pages of the documents being generated, the second scan result may include the first pages of the documents and not the second pages of the documents, or may include the second pages of the documents and not the first pages of the documents. Through the second scan result, the front pages of the documents may be displayed, or the back pages of the documents may be displayed. Referring to FIG. 2, in a case where scanning is performed upon the simplex scan interface 220 being selected, the second scan result for displaying one page of a document, for example, the front or back page of the document may be displayed.

Based on the scan data, the first scan result or the second scan result may be displayed. For example, in a case where scanning is performed upon the automatic scan interface 224 being selected, one of the first scan result and the second scan result may be displayed.

The electronic device may display the first scan result or the second scan result based on a predetermined criterion. The predetermined criterion may correspond to whether the first page or the second page of the document is a blank page. The blank page may be determined by a blank amount or the amount of content of a corresponding page, and the like. For example, in a case where the second page of the document is a blank page, a second scan result including the first page of the document and not the second page of the document may be displayed based on the scan data generated for the first page and the second page of the document. For example, in a case where both the first page and the second page of the document are not blank pages, a first scan result including the first page and the second page of the document may be displayed based on the scan data generated for the first page and the second page of the document. This allows a user to scan documents without considering which option to choose between the two-sided (duplex) scan option and the single-sided (simplex) scan option, or whether the front page of the document is facing up or down.

Therefore, an appropriate scan result may be selected among the simplex and duplex scan results and provided to the user. Furthermore, showing blank pages in the scan result may be prevented. In addition, the inconvenience of editing a document file generated by scanning a document, for example, a PDF file can be eliminated. A suitable result may refer to a result in which a blank page is excluded from a document for which scan data is generated, but is not limited thereto.

In a case where scan data for the first and second pages of the documents are generated, the electronic device may display the first scan result or the second scan result based on a predetermined criterion. The predetermined criterion may correspond to whether at least one first page or at least one second page of at least one of the documents is a blank page. For example, one of the first scan result and the second scan result may be displayed based on whether the first page or the second page of a first scanned document is a blank page. The predetermined criterion may be a number of blank pages of the at least one first page or the at least one second page of the at least one document. For example, in a case where there are more blank second pages than blank first pages, a second scan result including the first pages of the documents and not including the second pages of the documents may be displayed.

Scan data generated for the first page or the second page of the document may be referred to as simplex scan data. If the user recognizes which page is a scrap paper or blank in the document, the user may cause the electronic device to generate scan data for a page opposite to the scrap paper or blank page, that is, the scan data may be generated for a page containing contents of the document. The simplex scan data generated for the first page or the second page of the document may include a blank page, and a scan result in which at least one page is skipped according to a predetermined criterion in the simplex scan data may be displayed on the electronic device.

The electronic device may display a scan result in which at least one page is skipped according to a predetermined criterion in the scan data. The skipped at least one page may be a blank page, and the predetermined criterion may correspond to an amount of content or a blank amount in a corresponding page. The blank page skip option may be activated to skip a blank page in the scan data.

The electronic device may display a scan result in which at least one page is skipped according to a predetermined criterion in scan data generated for the first page and the second page of the document. For example, the electronic device may display the scan result in which at least one page is skipped according to the predetermined criterion in a scan result selected from among the first scan result and the second scan result. A scan result in which at least one page is skipped according to a predetermined criterion in a scan result selected from among the first scan result and the second scan result may be referred to as a third scan result. The skipped at least one page may be a blank page, and the predetermined criterion may include an amount of content or a blank amount in a corresponding page. The blank page skip option may be activated to skip a blank page in the scan data.

The third scan result may not include at least one page skipped according to a predetermined criterion, but is not limited thereto. The skipped at least one page may be hidden in the third scan result. The skipped at least one page and the other non-skipped page may be separated in the third scan result. Various example methods of displaying the third scan result based on the skipped at least one page will be described later with reference to FIGS. 5 and 6.

In a case where an interface 230 for printing a scanned document is selected, the display of the scan result may be omitted. That is, a copy may be printed based on the scan result without displaying the scan result. The user interface 200 may include an interface for setting options related to copying of the scanned document. Example options related to the copying of the document may include a color copy, a grayscale copy, a number of copies, and the like.

Figure 3:
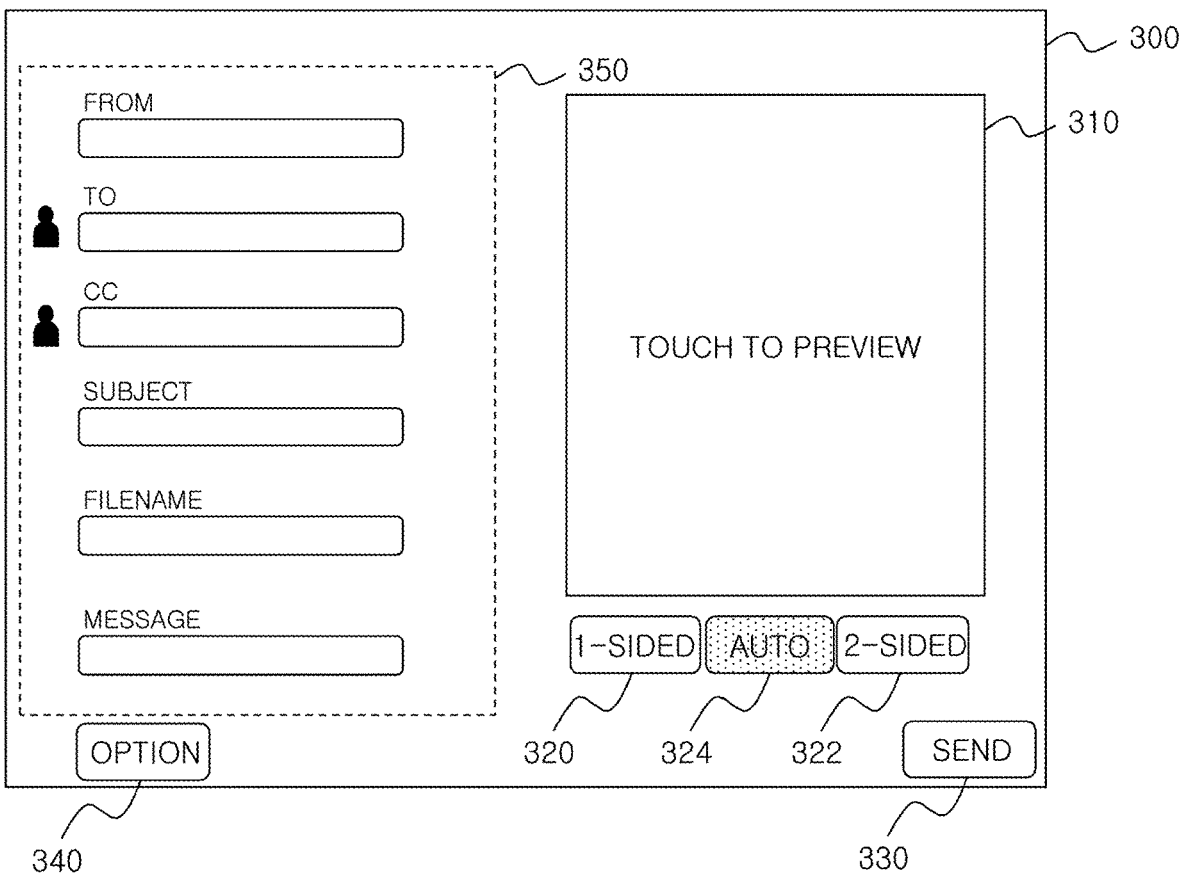
FIG. 3 is a diagram illustrating a user interface displayed on an electronic device to scan and transmit a document according to an example.

FIG. 3 is a diagram illustrating a user interface displayed on an electronic device to scan and transmit a document according to an example.

Referring to FIG. 3, a user interface 300 related to a document scan may be a user interface 300 to transmit a scanned document. The user interface 300 may include various interfaces 320, 322, 324, and 340 for setting options of a scan. The interfaces 320, 322, 324, and 340 for setting scan options in FIG. 3 are substantially the same as the interfaces 220, 222, 224 and 240 of FIG. 2, and thus a redundant description will be omitted. The user interface 300 may include an interface 310 to display a preview of a scan result. The interface 310 is substantially the same as the interface 210 of FIG. 2, such that a redundant description will be omitted.

The user interface 300 may include an interface 350 to set options related to transmission of the scanned document. The document may be transmitted via e-mail, and the interface 350 to set options related to the transmission of the document may include various entries used for e-mail transmission, for example, a sender address, a recipient address, reference addresses, titles, contents, attachments of an e-mail, and the like. The scanned document may be included in the email as an attachment.

The user interface 300 may include an interface 330 to transmit a scanned document. In a case where the interface 330 to transmit the scanned document is selected, the display of the scan result may be omitted. That is, the scan result may be transmitted without displaying the scan result.

Figure 4:
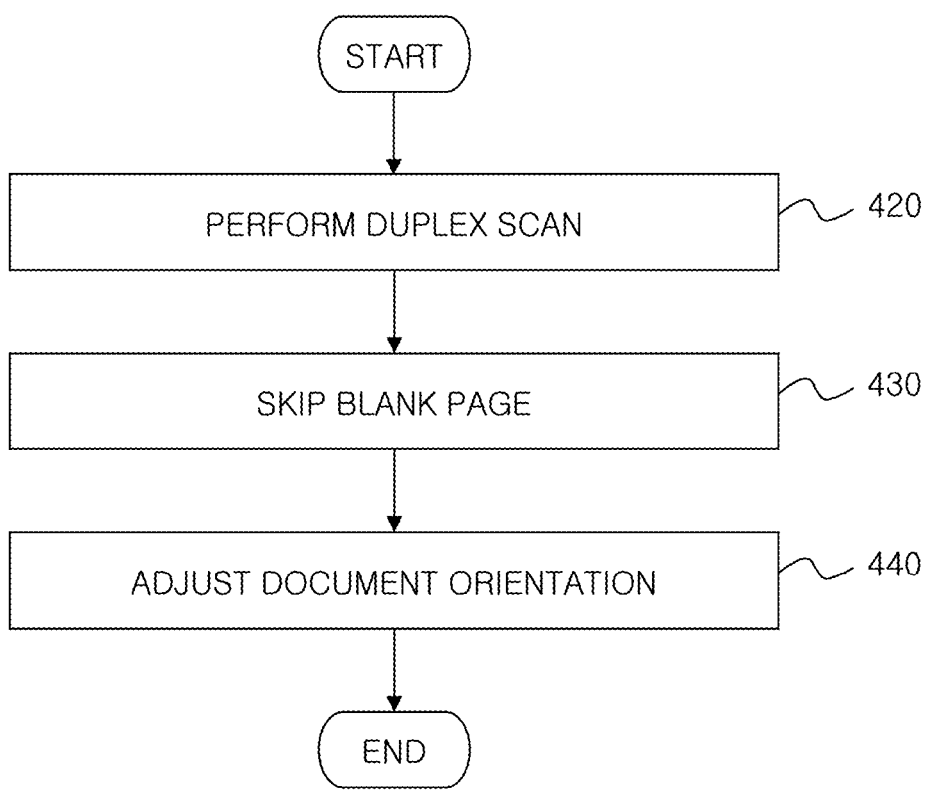
FIG. 4 is a flowchart illustrating a process of scanning a document in an electronic device according to an example.

FIG. 4 is a flowchart illustrating a process of scanning a document in an electronic device according to an example.

Referring to FIG. 4, the electronic device may perform a two-sided (duplex) scan on a document at operation 420. By performing duplex scanning of the document, the electronic device may generate scan data for the first page and the second page of the document. Operation 420 is substantially the same as operation 120 of FIG. 1, such that a redundant description will be omitted.

In operation 430, the electronic device may skip a blank page in the scan data or the scan result. Operation 430 is substantially the same as operation 130 of FIG. 1, such that a redundant description will be omitted.

In operation 440, the electronic device may change an orientation of a scanned document. For example, the orientation of the pages included in the scan data or the scan result may be changed. The orientation of the document may be changed so that the orientation of each page of the document coincides. For example, the orientation of the document may be changed to be portrait (i.e., vertical) or landscape (i.e., horizontal). The documents whose orientation is changed or adjusted may all have the same orientation, but are not limited thereto. The orientation of the document may be determined based on a writing orientation of the document. For example, based on the writing direction of the first page of the document, the directions of all pages of the document may be determined. All pages of the document scanned in the vertical direction may include a page where text is written in a vertical direction and a page where text is written in a horizontal direction. In that case, it may be inconvenient for a user to turn their head to read the scanned document or to manually change the orientation of the page. In order for a user to comfortably read the scanned document, orientations of pages of each document may be determined based on a writing direction of each document. For example, among pages of a document scanned in the vertical direction, the document direction of the page where text is written in the vertical direction is changed to the vertical direction, and the document direction of the page where text is written in the horizontal direction is changed to the horizontal direction. Accordingly, the text on the pages may run in the same direction, e.g., from left to right and from top to bottom.

FIG. 4 illustrates that operation 430 is performed before operation 440, but is not limited thereto. That is, operation 440 may be performed before operation 430.

Figure 5:
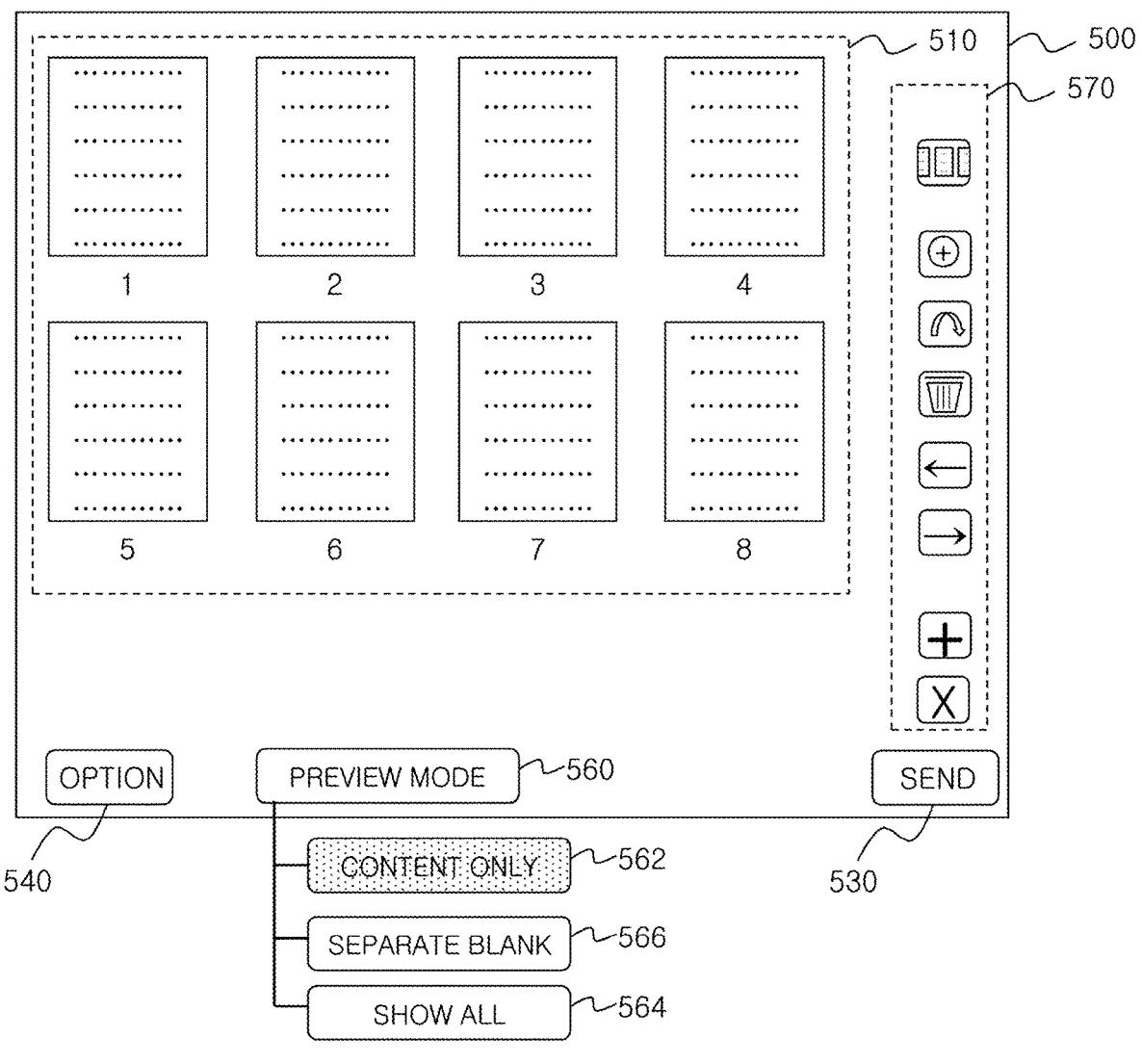
FIG. 5 is a diagram illustrating a user interface to review a scanned document in a first state according to an example.

FIG. 5 is a diagram illustrating a user interface to review a scanned document in a first state according to an example.

Referring to FIG. 5, a user may review a scanned document, that is, a scan result through a user interface 500 related to the document scan. In an example, by selecting the interface 210 for displaying a preview of the scan result in FIG. 2, the user interface 500 may be displayed.

In the example of FIG. 5, the user interface 500 may include an interface 560 to set a preview mode of a scanned document. Based on the interface 560 being selected, interfaces 562, 564, and 566, each indicating a supported preview mode, may be displayed (e.g., pop up).

The preview mode of the scanned document may include, but is not limited to, a "content only" preview mode, a "separate blank" preview mode, and a "show all" preview mode. Referring to FIG. 5, in the scan result, a third scan result 510 in which at least one blank page is skipped according to a predetermined criterion may be displayed. By selecting the "content only" preview mode 562 through the interface 560 for setting the preview mode, the third scan result 510 may be displayed. The preview mode of the scanned document may be set to the "content only" preview mode, and a page other than a blank page of the scanned document may be displayed as the third scan result 510. The third scan result 510 may not include the at least one skipped page, or the skipped at least one page may be hidden from the third scan result 510.

In the "show all" preview mode, the skipped page and the page including the content may be displayed together according to the scanned order.

The user interface 500 may include an interface 530 to transmit a scanned document or an edited document through the user interface 500. The user interface 500 may include an interface 540 for setting options related to scanning or sending a document. The user interface 500 may include various interfaces 570 for editing the scanned document. For example, page layout, enlargement ratio, page rotation, deletion, moving to a previous page, moving to a next page, adding a page, deleting a page, etc. may be set through the interface 570.

Figure 6:
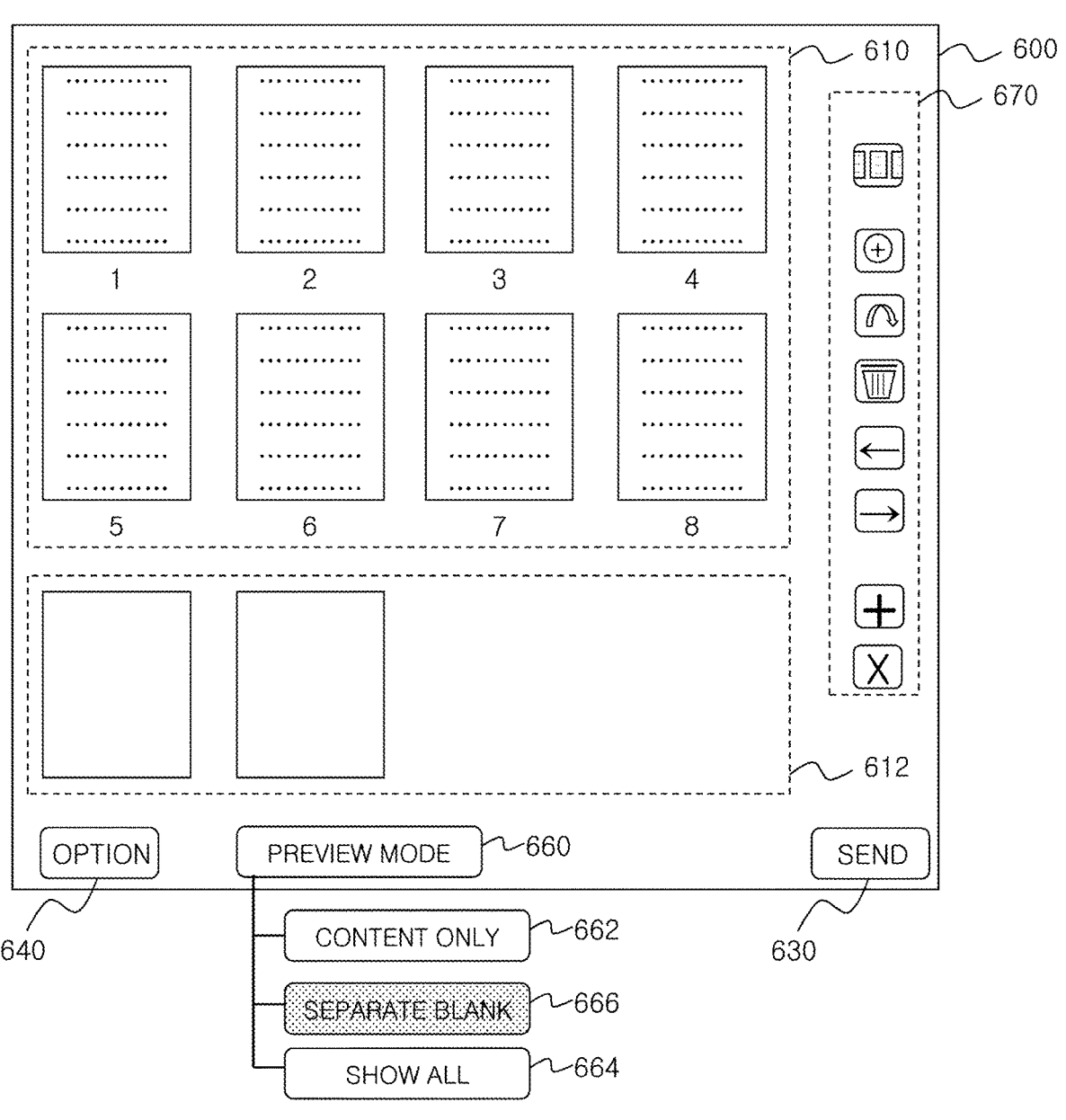
FIG. 6 is a diagram illustrating a user interface to review a scanned document in a second state according to an example.

FIG. 6 is a diagram illustrating a user interface to review a scanned document in a second state according to an example.

Referring to FIG. 6, a user may review a scanned document, that is, a scan result through a user interface 600 related to the document scan. In an example, by selecting the interface 210 for displaying a preview of the scan result in FIG. 2, the user interface 600 may be displayed.

In the example of FIG. 6, the user interface 600 may include an interface 660 to set a preview mode of a scanned document. Based on the interface 660 being selected, interfaces 662, 664, and 666, each indicating a supported preview mode, may be displayed (e.g., pop up). In the scan result, a third scan result 610 in which at least one blank page is skipped according to a predetermined criterion may be displayed. The preview mode of the scanned document may be set to the "separate blank" preview mode, so that the skipped blank page and the remaining non-skipped page of the scanned document can be displayed separately. The skipped blank page may be hidden as shown in FIG. 5 by selecting the "content only" preview mode 662. The skipped blank page may be displayed in a space 612 visually separated from the third scan result 610.

In the "show all" preview mode, the page including the content and the skipped page may be displayed together according to the scanned order.

Through the interface 670 for editing the scanned document, the skipped page may be added back to the scan result, or the selected page may be excluded from the scan result. The page excluded from the scan result may be moved to the space 612 in which the blank page is displayed.

FIG. 6 illustrates that the skipped page and the non-skipped page are displayed in different spaces 610 and 612 in the scan result, but is not limited thereto. For example, the skipped and non-skipped pages may be displayed together according to the scanned order, and a graphical representation indicating the skipped pages may be displayed. The graphic representation indicating the skipped page may include a gray out of the skipped page, an icon overlaid on the skipped page, and the like.

The user interface 600 may include an interface 630, an interface 640, and various interfaces 670 which are substantially the same as the interface 530, the interface 540, and the various interfaces 570 described above with reference to FIG. 5 such that a redundant description will be omitted.

Figure 7:
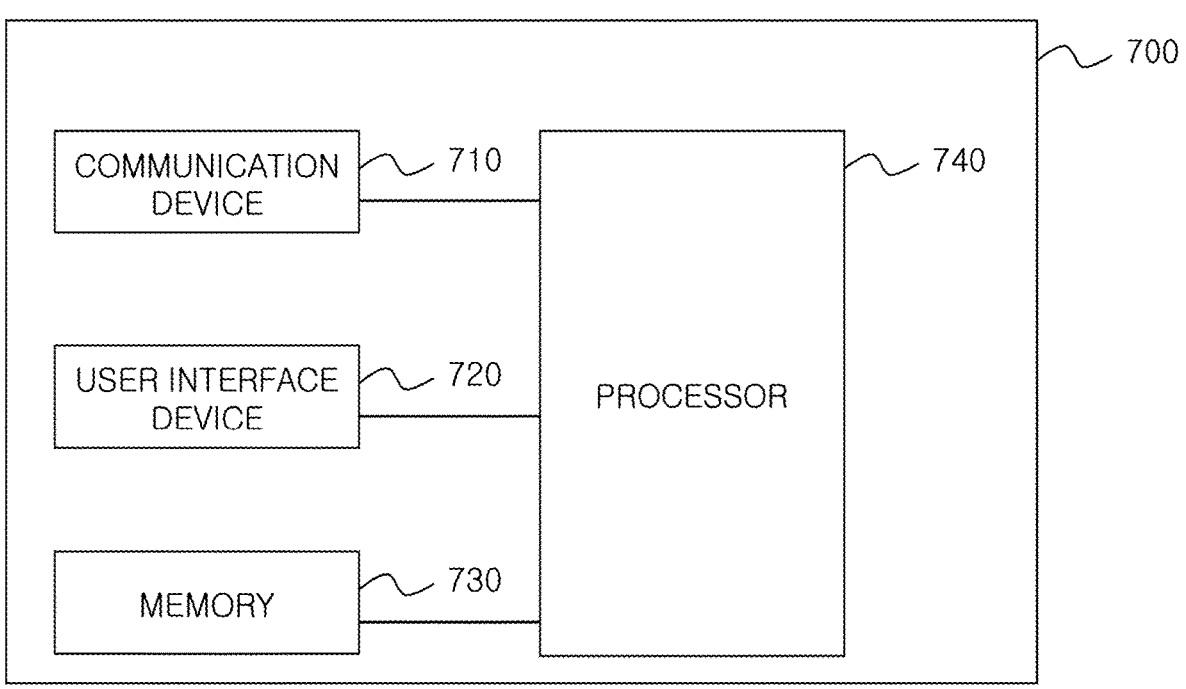
FIG. 7 is a block diagram of an electronic device according to an example.

FIG. 7 is a block diagram of an electronic device according to an example.

Referring to FIG. 7, the electronic device 700 may include a communication device 710, a user interface device 720, a memory 730 and a processor 740. However, the electronic device 700 may be realized by more or fewer components than the illustrated components.

The communication device 710 may communicate with an external apparatus. As an example, the communication device 710 may be connected to a network in a wired or wireless manner and communicate with the external apparatus. Here, the external apparatus may be an electronic apparatus, a server, etc.

The communication device 710 may include a communication module (e.g., a transceiver) that supports one of various wired/wireless communication methods. For example, the communication module may be of a chipset type or may be a sticker/barcode (e.g., a sticker including a near field communication (NFC tag)) including information used for communication. Also, the communication module may be a short range communication module or a wired communication module.

For example, the communication device 710 may support at least one of Wireless LAN, Wireless Fidelity (Wi-Fi), Wi-Fi Direct (WFD), Bluetooth, Bluetooth Low Energy (BLE), Wired Lan, NFC), Zigbee, infrared Data Association (IrDA), 3G, 4G, 5G, or the like.

The user interface device 720 may include an input unit to receive, from the user, an input to control an operation of the electronic device 700 and an output unit to display a result according to the operation of the electronic device 700 or information regarding a state of the electronic device 700.

For example, the user interface device 720 may include a manipulation panel to receive a user input, a display panel to display a screen, etc.

As an example, the input unit may include at least one device to receive various types of user inputs, such as a keyboard, a physical button, a touchscreen, a camera, a microphone, or the like. Also, the output unit may include, for example, a display panel, a speaker, or the like, but is not limited thereto. For example, the user interface device 720 may include a device that supports various inputs and outputs.

The memory 730 may store machine readable instructions or a program. For example, the memory 730 may store instructions to display a user interface related to a document scan, instructions to generate scan data regarding a first page and a second page of a document in response to a user input, instructions to display a scan result based on the scan data, or the like.

The memory 730 may include at least one from among a flash memory type memory, a hard disk type memory, a multimedia card micro type memory, a card type memory (e.g., a secure digital (SD) memory, an extreme digital (XD) memory, etc.), a random access memory (RAM), a static RAM (SRAM), a read-only memory (ROM), a programmable ROM (PROM), an electrically erasable PROM (EEPROM), a magnetic memory, a magnetic disk, an optical disc, or the like.

The processor 740 may control an operation of the electronic device 700 and may include at least one processor such as a Central Processing Unit (CPU). The processor 740 may include at least one processor peculiar to each function or one integrated processor.

The processor 740 may execute a program stored in the memory 730, read data or a file stored in the memory 730, or store new data or a file in the memory 730. The processor 740 may perform various operations described herein by executing a program or instructions stored in the memory 730, and redundant explanation will be omitted.

Figure 8:
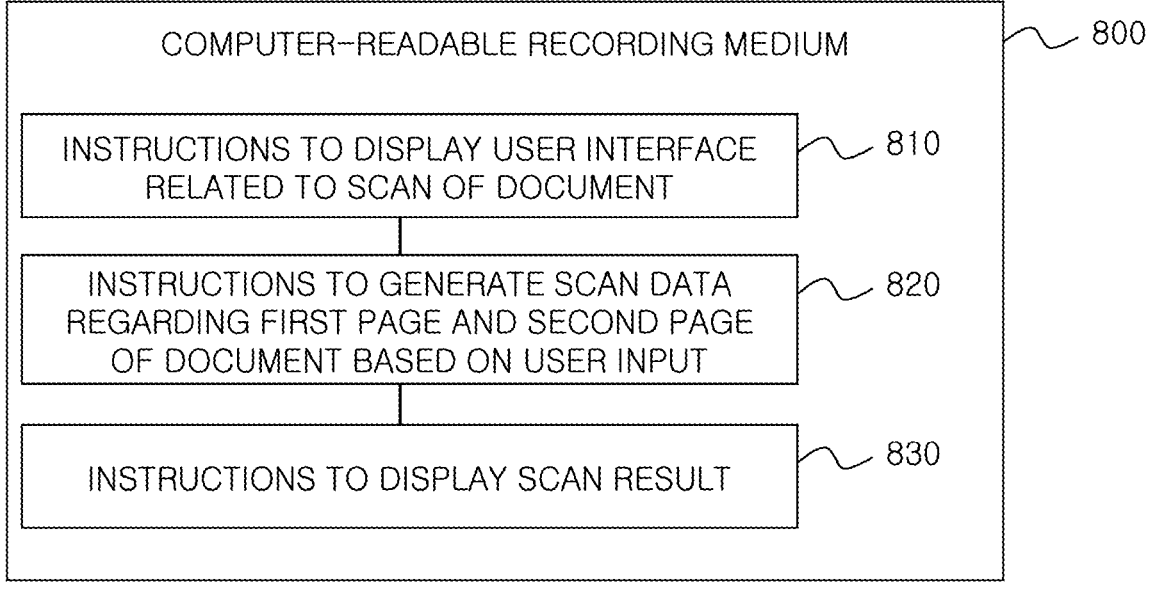
FIG. 8 is a diagram illustrating instructions stored in a non-transitory computer-readable storage medium according to an example.

FIG. 8 is a diagram illustrating instructions stored in a non-transitory computer-readable storage medium according to an example.

Referring to FIG. 8, the non-transitory computer-readable storage medium 800 may include instructions 810 to display a user interface related to a document scan, instructions 820 to generate scan data regarding a first page and a second page of a document, and instructions 830 to display a scan result based on the scan data, but is not limited thereto. The non-transitory computer-readable storage medium 800 may include more or fewer instructions than the instructions illustrated in FIG. 8.

The instructions 830 to display the scan result based on the generated scan data may include instructions to display a first scan result including a first page and a second page of the document, a second scan result including the first page or the second page of the document without including the second page or the first page of the document, and a third scan result where at least one page is skipped from a selected scan result according to a predetermined criterion. The skipped at least one page may be a blank page.

The instructions 830 to display the scan result based on the generated scan data may include instructions to hide the skipped at least one page in the third scan result, to separate the skipped at least one page and a non-skipped page in the third scan result, and to display a graphic representation indicating the skipped at least one page in the third scan result. The third scan result may not include the skipped at least one page.

Other functions of the instructions are substantially the same as those described above, such that redundant descriptions are omitted.

The example operation methods of the electronic device may be realized as a non-transitory computer-readable storage medium storing therein a command or data executable by a computer or a processor. The above-described example operation methods may be implemented in the form of a non-transitory computer-readable storage medium to store instructions or data executable by a computer or a processor. The above-described example operation methods of the image forming device may be written in a program executable by a computer, and may be implemented in a general-purpose digital computer that operates such a program using a non-transitory computer-readable storage medium. Examples of such a non-transitory computer-readable storage medium may include read-only memory (ROM), random-access memory (RAM), flash memory, compact disc (CD)-ROMs, CD-recordables (Rs), CD+Rs, CD-rewritables (RWs), CD+RWs, and digital versatile disc (DVD)-ROMs, DVD-Rs, DVD+Rs, DVD-RWs, DVD+RWs, DVD-RAMs, blu-ray disc (BD)-ROMs, BD-Rs, BD-recordable low to highs (R LTHs), BD-REs, magnetic tapes, floppy disks, magneto-optical data storage devices, optical data storage devices, hard disks, solid-state disks (SSDs), and any device capable of storing machine readable instructions, associated data, data files, and data structures, and providing a processor or computer with machine readable instructions, associated data, data files, and data structures such that the processor or computer may execute the instructions.

Although examples of the disclosure have been illustrated and described hereinabove, the disclosure is not limited to the abovementioned examples, but may be variously modified without departing from the scope and spirit of the disclosure as disclosed in the accompanying claims. These modifications should also be understood to fall within the scope of the disclosure.

What is claimed is:

1. An electronic device comprising:
   a processor; and
   a memory to store instructions executable by the processor, wherein the processor, by executing the instructions, is to:
   display a user interface related to a document scan;
   generate scan data regarding a first page and a second page of a document in response to a user input received through the user interface;
   display, through the user interface, a first scan result including the first page and the second page of the document or a second scan result including one of the first page and the second page of the document based on the scan data; and
   automatically select between displaying the first scan result and the second scan result based on a predetermined criterion corresponding to whether the first page or the second page of the document is a blank page.

2. The electronic device of claim 1, wherein the processor, by executing the instructions, is to:
   display, through the user interface, a third scan result where at least one page is skipped from the first scan result or the second scan result according to a predetermined criterion.

3. The electronic device of claim 1, wherein the processor, by executing the instructions, is to:

generate simplex scan data including the first page or the second page of the document and selected by a user input.

4. The electronic device of claim 1, wherein the user interface comprises an automatic scan interface, a simplex scan interface, and a duplex scan interface, and wherein the received user input comprises activation of the automatic scan interface.

5. The electronic device of claim 4, wherein, based on activation of the automatic scan interface, at least one option of performing a duplex scan, skipping a blank page, and changing a page orientation is activated.

6. The electronic device of claim 1, wherein the processor, by executing the instructions, is to:

generate the scan data by changing a page orientation of the document and matching orientations of pages of the document so that the orientation of each page of the document coincides.

7. The electronic device of claim 1, wherein the processor, by executing the instructions, is to:

generate the scan data by changing a page orientation of the document and matching writing orientations of pages of the document based on a writing direction of the document.

8. The electronic device of claim 2, wherein the at least one page includes a blank page.

9. The electronic device of claim 2, wherein the predetermined criterion comprises an amount of contents or a blank amount.

10. The electronic device of claim 2, wherein the processor, by executing the instructions, is to:

hide the skipped at least one page from the third scan result.

11. The electronic device of claim 2, wherein the processor, by executing the instructions, is to:

separate the skipped at least one page and a non-skipped page in the third scan result.

12. The electronic device of claim 2, wherein the third scan result does not include the skipped at least one page.

13. The electronic device of claim 2, wherein the processor, by executing the instructions, is to:

display a graphic representation indicating the skipped at least one page in the third scan result.

14. A non-transitory computer-readable storage medium storing instructions executable by a processor, the non-transitory computer-readable storage medium comprising:

instructions to display a user interface related to a document scan;

instructions to generate scan data regarding a first page and a second page of a document in response to a user input received through the user interface;

instructions to display, through the user interface, a first scan result including the first page and the second page of the document or a second scan result including one of the first page and the second page of the document based on the scan data; and instructions to automatically select between displaying the first scan result and the second scan result based on a predetermined criterion corresponding to whether the first page or the second page of the document is a blank page.

15. A method comprising:

displaying a user interface related to a document scan;

generating scan data regarding a first page and a second page of a document in response to a user input received through the user interface;

displaying, through the user interface, a first scan result including the first page and the second page of the document or a second scan result including one of the first page and the second page of the document based on the scan data; and automatically selecting between displaying the first scan result and the second scan result based on a predetermined criterion corresponding to whether the first page or the second page of the document is a blank page.

* * * * *